(12) United States Patent
Shargots et al.

(10) Patent No.: US 12,094,618 B2
(45) Date of Patent: Sep. 17, 2024

(54) NUCLEAR REACTOR FUEL ASSEMBLIES AND PROCESS FOR PRODUCTION

(71) Applicant: BWXT Advanced Technologies LLC, Lynchburg, VA (US)

(72) Inventors: Scott J. Shargots, Forest, VA (US); Gary W. Neeley, Forest, VA (US); Ryan Z. Ziegler, Forest, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 16/731,867

(22) Filed: Dec. 31, 2019

(65) Prior Publication Data

US 2020/0234834 A1 Jul. 23, 2020

Related U.S. Application Data

(60) Provisional application No. 62/794,320, filed on Jan. 18, 2019.

(51) Int. Cl.
*G21C 1/32* (2006.01)
*G21C 3/328* (2006.01)
*G21C 5/06* (2006.01)

(52) U.S. Cl.
CPC .............. *G21C 3/328* (2013.01); *G21C 5/06* (2013.01); *Y10S 376/903* (2013.01)

(58) Field of Classification Search
CPC ... G21C 3/06; G21C 3/16; G21C 3/30; G21C 3/32; G21C 3/324; G21C 3/328; G21C 3/344; G21C 5/06; G21C 3/36; G21D 5/02; Y10S 376/902
See application file for complete search history.

(56) References Cited

U.S. PATENT DOCUMENTS

| 1,270,144 | A | * | 6/1918 | Gallimore | ............... B23B 41/04 |
| | | | | | 408/241 R |
| 2,780,596 | A | * | 2/1957 | Anderson | ................ G21C 3/36 |
| | | | | | 376/268 |
| 2,814,217 | A | * | 11/1957 | O'Donnell | ............. B23Q 35/44 |
| | | | | | 82/19 |

(Continued)

FOREIGN PATENT DOCUMENTS

| BE | 740674 | * | 4/1970 | ............. G21C 15/14 |
| EP | 0818043 A1 | * | 1/1998 | ............... G21C 3/17 |
| WO | 2018/217821 A1 | | 11/2018 | |

OTHER PUBLICATIONS

International Search Report and Written Opinion, PCT/US2020/13119, dated May 14, 2020, 11 pages.

(Continued)

*Primary Examiner* — Lily C Garner
(74) *Attorney, Agent, or Firm* — Nelson Mullins Riley & Scarborough LLP

(57) ABSTRACT

A nuclear fuel assembly for a nuclear reactor core including at least one fuel cartridge having a lattice structure including an outer wall defining an interior volume, at least one flow channel extending through the interior volume of the lattice structure, at least one lattice site disposed in the interior of the lattice structure; and at least one fuel compact disposed within a corresponding one of the at least one lattice site. A cross-sectional shape of the at least one fuel compact is the same as a cross-sectional shape of the corresponding one of the at least one lattice site.

20 Claims, 7 Drawing Sheets

(56) References Cited

U.S. PATENT DOCUMENTS

| | | | | |
|---|---|---|---|---|
| 2,902,422 | A | * | 9/1959 | Hutter .................. G21C 3/34 376/454 |
| 2,941,933 | A | * | 6/1960 | Roake ................ G21C 21/02 376/454 |
| 2,969,312 | A | * | 1/1961 | Monson ................ G21C 3/04 376/424 |
| 3,413,196 | A | * | 11/1968 | Fortescue .............. G21C 1/12 376/427 |
| 3,687,805 | A | * | 8/1972 | Desbois ............... G21C 3/338 376/454 |
| 4,274,920 | A | * | 6/1981 | Renko .................. G21C 9/02 976/DIG. 146 |
| 4,285,769 | A | * | 8/1981 | Specker ................ G21C 1/00 376/267 |
| 4,654,193 | A | * | 3/1987 | Amano ................ G21C 3/338 976/DIG. 70 |
| 6,212,250 | B1 | * | 4/2001 | Korton ................. G21C 3/32 376/261 |
| 6,516,043 | B1 | | 2/2003 | Chaki et al. |
| 10,170,207 | B2 | * | 1/2019 | Bashkirtsev ............ G21C 3/34 |
| 11,404,177 | B2 | * | 8/2022 | Mariani ................. G21C 3/28 |
| 11,919,815 | B2 | * | 3/2024 | Terrani ............... C04B 35/5622 |
| 2002/0080908 | A1 | | 6/2002 | Nakamaru et al. |
| 2002/0149125 | A1 | | 10/2002 | Gradel et al. |
| 2009/0274260 | A1 | | 11/2009 | Russell, II et al. |
| 2014/0192949 | A1 | | 7/2014 | Feinroth et al. |
| 2014/0334595 | A1 | * | 11/2014 | Bashkirtsev ........... G21C 3/328 376/412 |
| 2015/0206604 | A1 | | 7/2015 | Pencer et al. |
| 2017/0040069 | A1 | * | 2/2017 | Venneri ................. G21C 21/02 |

OTHER PUBLICATIONS

Invitation to Pay Additional Fees and Where Applicable Protest Fees, PCT/US2020/13119, dated Mar. 12, 2020, 2 pages.

Extended European Search Report, EP Application No. 20741080.4, dated Dec. 1, 2022, 4 pages.

* cited by examiner

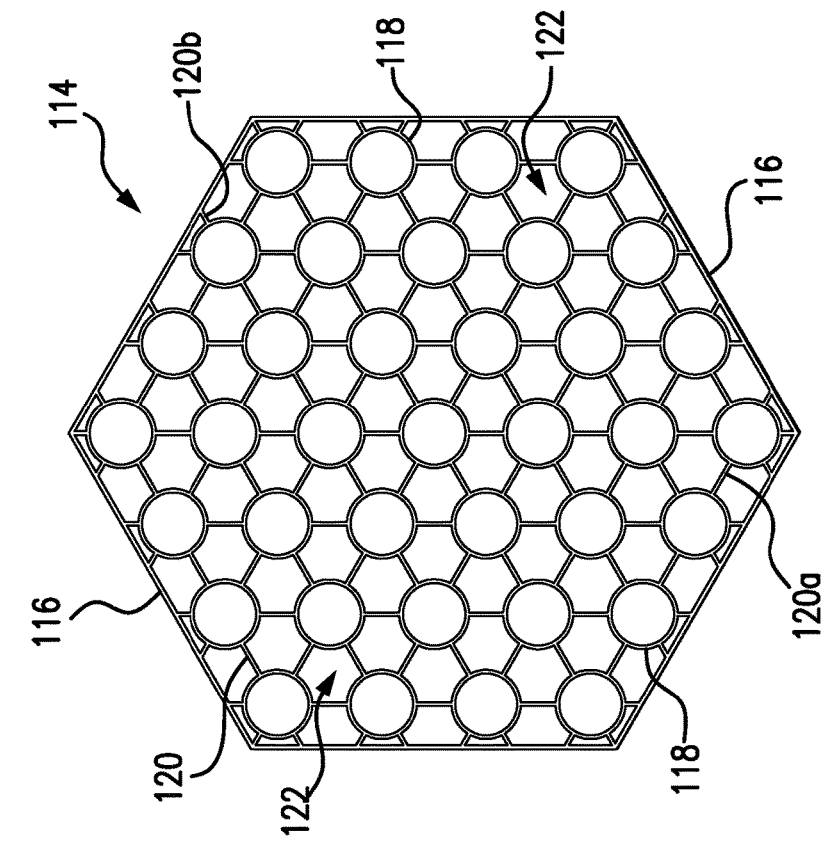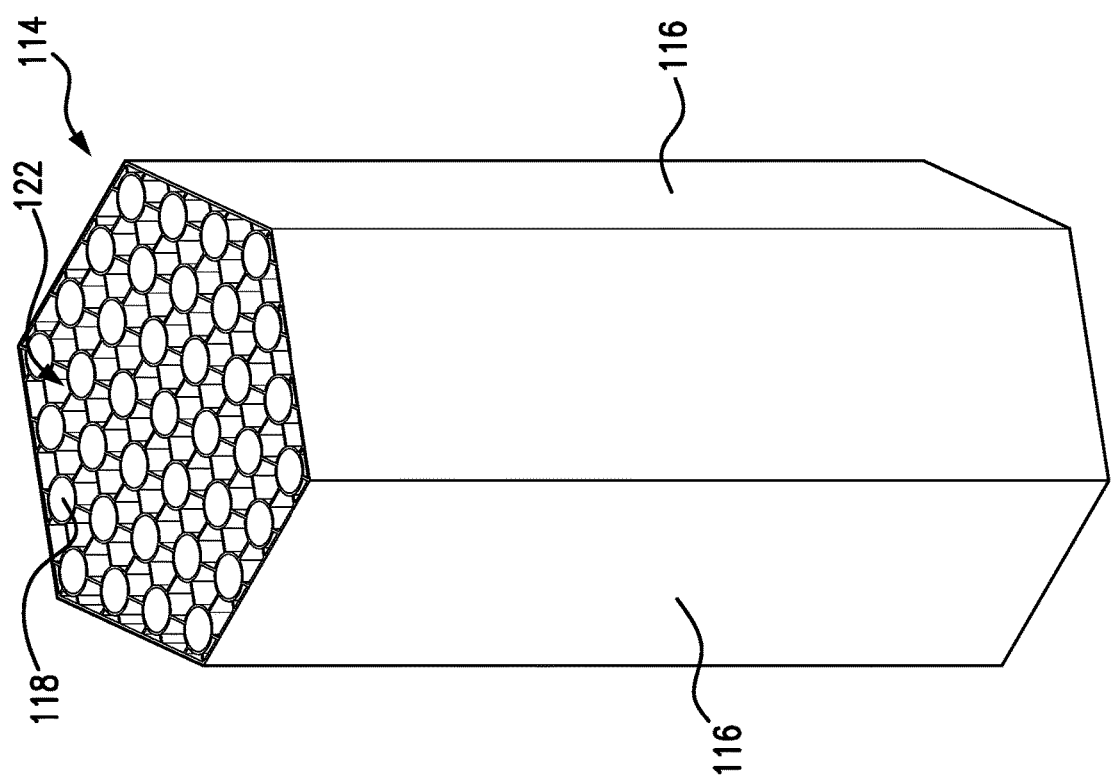

NUCLEAR REACTOR FUEL ASSEMBLIES AND PROCESS FOR PRODUCTION

CLAIM OF PRIORITY

This application claims priority to U.S. provisional patent application No. 62/794,320 filed Jan. 18, 2019, the disclosure of which is incorporated by reference herein.

TECHNICAL FIELD

The presently-disclosed invention relates generally to nuclear reactors and, more specifically, to fuel assembles for use in constructing reactor cores and processes for producing those fuel assemblies.

BACKGROUND

The concept of utilizing nuclear thermal propulsion to propel space craft during space travel is known. Existing propulsion concepts typically utilize a fuel assembly manufacturing process known as the fuel dispersion method. With the fuel dispersion method, uranium-based fuel kernels are created, with the kernels being on the order of 200 to 400 μm in diameter. The kernels are often fabricated by traditional internal gelation processes or advanced sol-gel processing methods. The kernels are coated with a metallic matrix material, such as tungsten, to encapsulate the fuel kernels. Once coated, the particles are embedded in a metal matrix material, such as tungsten powder, and formed into a monolithic part by metallurgical compaction techniques such as hot isostatic pressing, etc. However, various difficulties are known to exist with the fuel dispersion method for creating fuel assemblies. For example, challenges exist when creating fuel kernels below 400 μm, as well as with coating the fuel kernels with refractory metals such as, but not limited to, tungsten, molybdenum, etc. Inconsistent coating of the fuel kernels can be very problematic when trying to achieve high fuel packing factors, such as those that are desirable for fuel assembles to be used in nuclear thermal propulsion applications. Specifically, improperly coated fuel kernels may come into contact with each other and clump together, which may lead to fuel melting and/or fuel loss. Moreover, reactor core neutronic analysis may be impaired as the exact location of the coated fuel kernels within the metallic matrix material is not known. The need to prevent clumping of the coated fuel kernels requires that an adequate amount of matrix material (tungsten powder) be used, which can hamper the ability to achieve packing factors that are adequate for fuel assemblies that are used in the noted nuclear thermal propulsion applications.

There at least remains a need, therefore, for fuel assemblies, and processes for producing the same, that are suitable for use in nuclear thermal propulsion assemblies.

SUMMARY OF INVENTION

One embodiment of the present invention provides a nuclear fuel assembly for a nuclear reactor core including at least one fuel cartridge having a lattice structure with an outer wall defining an interior volume, at least one flow channel extending through the interior volume of the lattice structure, at least one lattice site disposed in the interior of the lattice structure and at least one fuel compact disposed within a corresponding one of the at least one lattice site. A cross-sectional shape of the at least one fuel compact is the same as a cross-sectional shape of the corresponding one of the at least one lattice site.

Another embodiment of the present invention provides a nuclear fuel assembly for a nuclear reactor core, having at least one fuel compact including a fuel compact cladding tube defining an interior volume, and a plurality of fuel pins, each fuel pin including a pin cladding tube defining an interior volume, and fissionable fuel disposed within the interior volume of the pin cladding tube, wherein the plurality of fuel pins is disposed within the interior volume of the fuel compact cladding tube, and the cross-sectional shape of the fuel compact is defined by the fuel compact cladding tube.

The accompanying drawings, which are incorporated in and constitute a part of this specification, illustrate one or more embodiments of the invention and, together with the description, serve to explain the principles of the invention.

BRIEF DESCRIPTION OF THE DRAWING

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements.

FIGS. 3A and 3B are a perspective view and an end view, respectively, of a lattice structure of the fuel assembly shown in FIG. 2;

Figure 2:
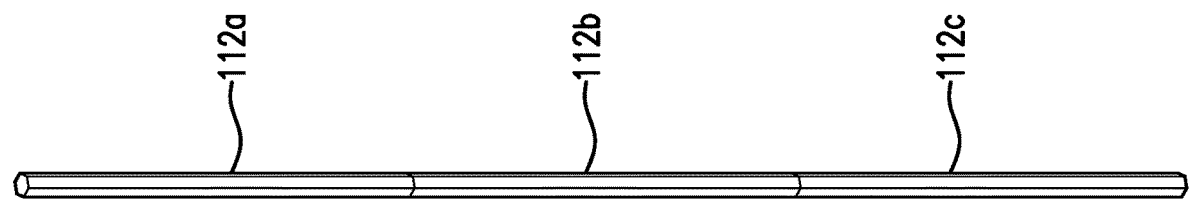
FIG. 2 is a perspective view of a fuel assembly shown in FIG. 1.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not, all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Figure 1:
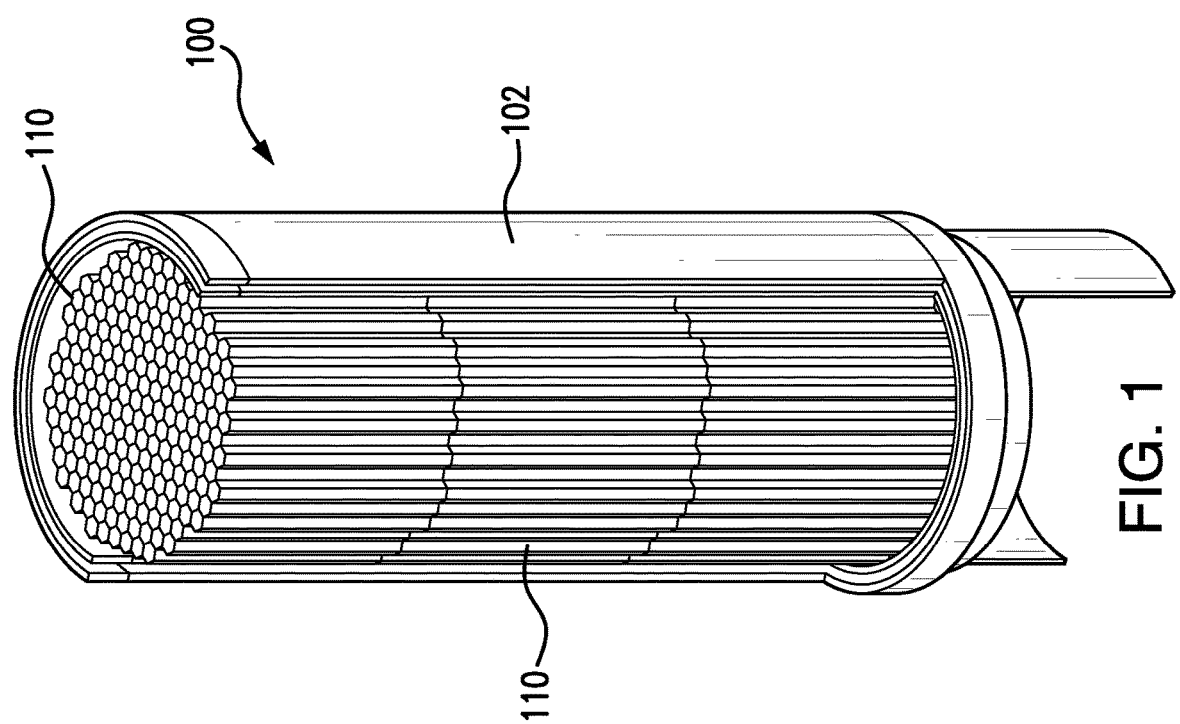
FIG. 1 is a perspective view of a nuclear reactor core including fuel assemblies constructed in accordance with an embodiment of the present invention.
Figure 8:
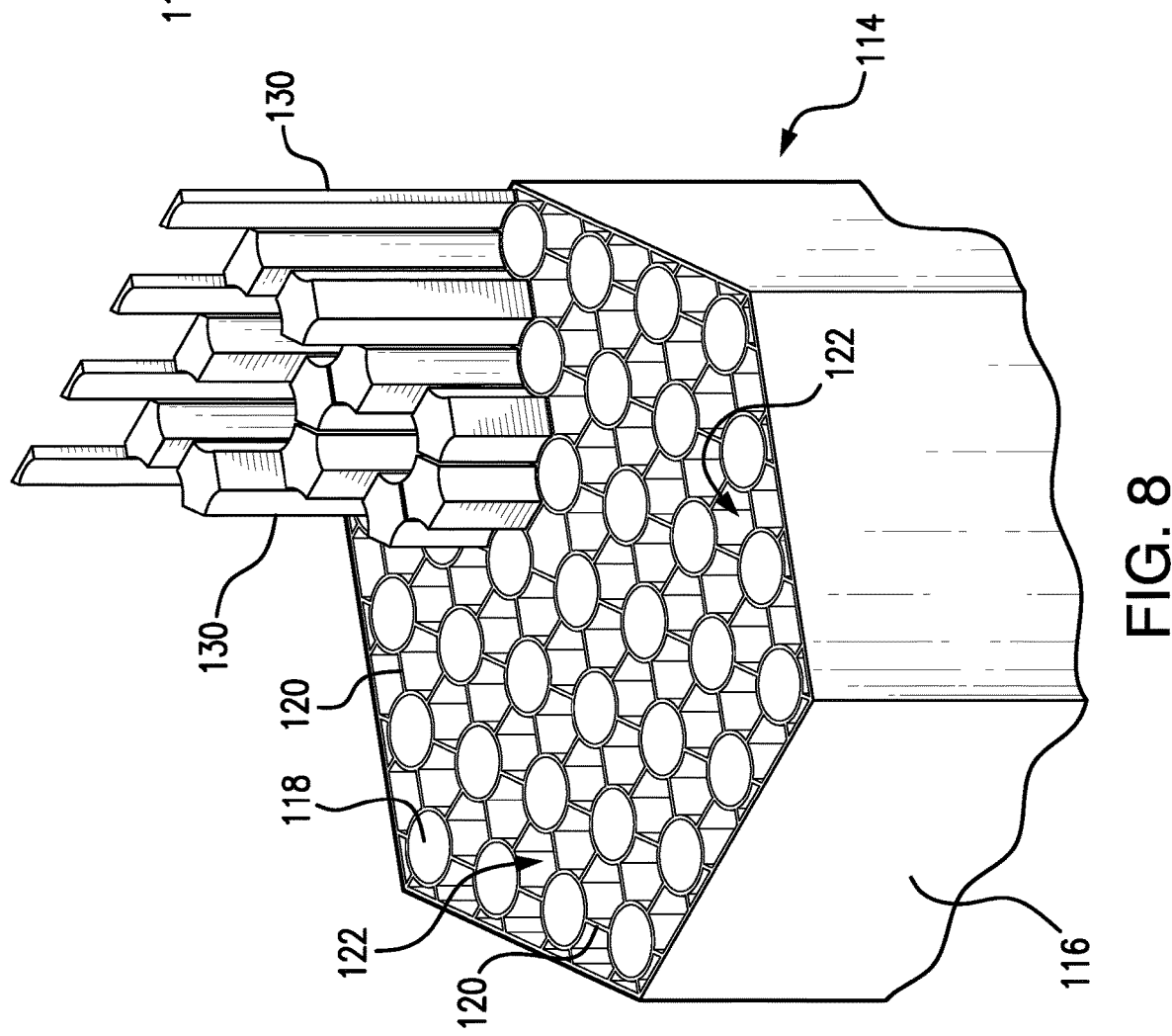
FIG. 8 is a partial perspective view of the assembly of a fuel cartridge in accordance with an embodiment of the present invention.

Referring now to the figures, a reactor core 100 in accordance with the present invention includes a plurality of modular fuel assemblies 110 that are received in a vessel shell 102, as best seen in FIGS. 1 and 2. Preferably, each fuel assembly 110 has a hexagonal cross-section and is formed by a plurality of fuel cartridges 112a, 112b, 112c, etc., as discussed in greater detail below. Preferably, each fuel cartridge 112 includes a lattice structure 114 defining a plurality of lattice sites 122 in its interior, and a plurality of fuel compacts 130 disposed therein. Each fuel compact 130 is received in a correspondingly-shaped lattice site 122, as best seen in FIG. 8. Note, although the discussed fuel assembly 110 preferably has a hexagonal cross-section, in alternate embodiments the fuel assemblies may have different cross-sectional shapes such as, but not limited to, triangular, square, rectangular, etc.

As shown in FIGS. 3A and 3B, lattices structure 114 includes a plurality of sidewalls 116 defining an elongated shell, a plurality of the elongated tubes 118 disposed within lattice structure 114 so that a longitudinal center axis of each elongated tube 118 is parallel to a longitudinal center axis of lattice structure 114, and a plurality of inner walls 120 defining a plurality of lattice sites 122 within the lattice structures. Each elongated tube 118 extends the full length of lattice structure 114, thereby forming a channel through which reactor coolant may flow during reactor operations. Some inner walls 120a of lattice structure 114 extend between pairs of elongated tubes 118, whereas other inner walls 120b extend between a corresponding elongated tube 118 and an adjacent sidewall 116 of lattice structure 114. As such, each lattice site 122 does not have the same cross-sectional shape. As best seen in FIG. 3B, the presently discussed embodiment of lattice structure 114 includes thirty-seven elongated tubes 118 and ninety-six full and partial lattice sites 122. Note, however, in alternate embodiments different numbers of elongated tubes 118 and lattice sites 122 may be present. Preferably, lattice structure 114 is formed by additive manufacturing (also known as metal 3D printing) consisting of a monolith structure of the desired material such as, but not limited to, molybdenum. Alternatively, lattice structure 114 is formed by a plurality of cut sheets of the desired material, such as molybdenum, which are arranged into the desired lattice geometry and then resistance welded to form the component.

Figure 5:
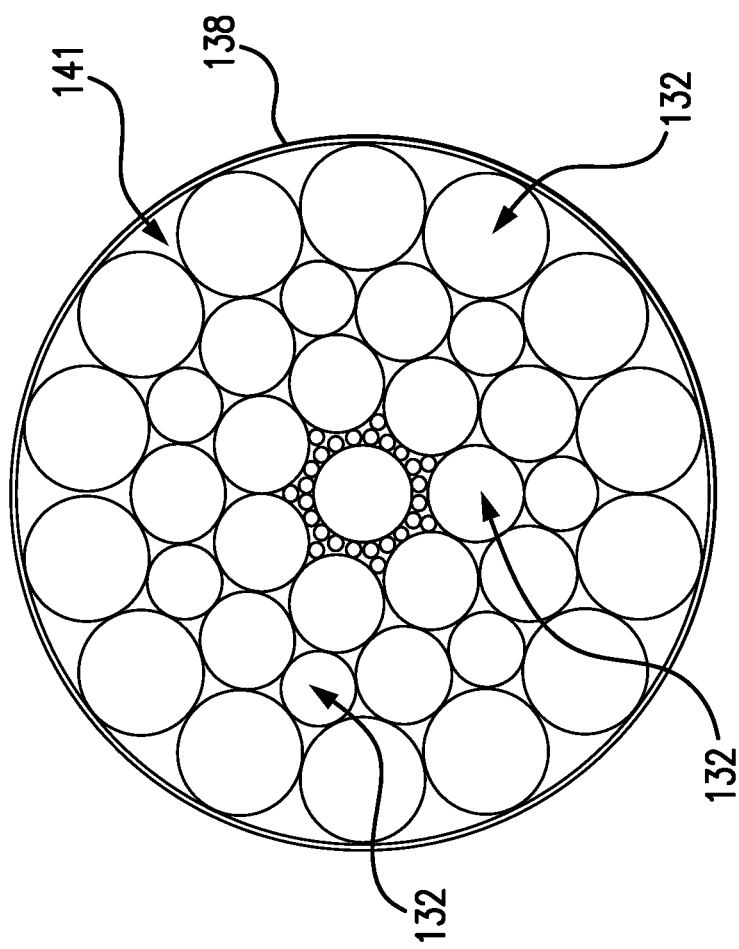
FIG. 5 is an end view of a fuel compact in accordance with an embodiment of the present invention.
Figure 4:
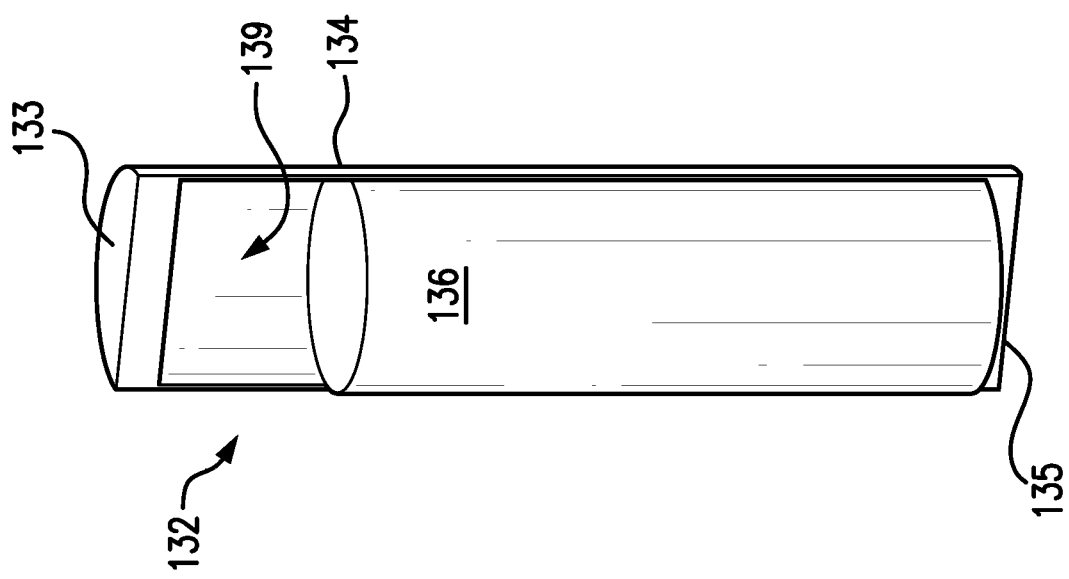
FIG. 4 is a partial perspective view of a fuel pin in accordance with an embodiment of the present invention.

As best seen in FIG. 8, each fuel compact 130 of fuel assembly 110 is formed so that its cross-sectional shape is the same as that of a corresponding lattice site 122. Referring additionally to FIGS. 4 and 5, each fuel compact 130 is formed by a plurality of elongated fuel pins 132 that are disposed in an elongated fuel compact cladding tube 138 prior to a swaging process to achieve the desired cross-sectional shape of the fuel compact, as is discussed in greater detail below. As best seen in FIG. 4, each fuel pin 132 includes a pin cladding tube 134 that is sealed by a top wall 133 and a bottom wall 135 so that pin cladding tube 134 defines a sealed interior volume 139. The tube is sealed with top and bottom walls 133 and 135 after a fuel pellet 136 is disposed inside pin cladding tube 134 so that pin cladding tube 134 serves as the cladding for the fuel. As shown, fuel pellets 136 are preferably utilized for the fuel pins. However, in alternate embodiments of the invention, fuel kernels, fuel powder, etc., may be used rather than pellets.

Each assembled pin cladding tube 134 and fuel pellet 136 also undergoes a swaging process during which the desired final diameter of fuel pin 132 is achieved. The pin diameters are chosen to meet the desired fuel packing factor requirements of the fuel assembly. After swaging, each fuel pin 132 is disposed in a corresponding fuel compact cladding tube 138, as best seen in FIG. 5. Note, in order to achieve the desired fuel packing factor requirements, fuel pins 132 of different diameters are produced in order to reduce the collective volume defined by interstitial spaces 141 within the fuel compact cladding tube. In the preferred embodiment shown, the pin diameters are selected so that fuel pins 132 may be arranged in a Warrington Seale configuration within fuel compact cladding tube 138.

Figure 6B:
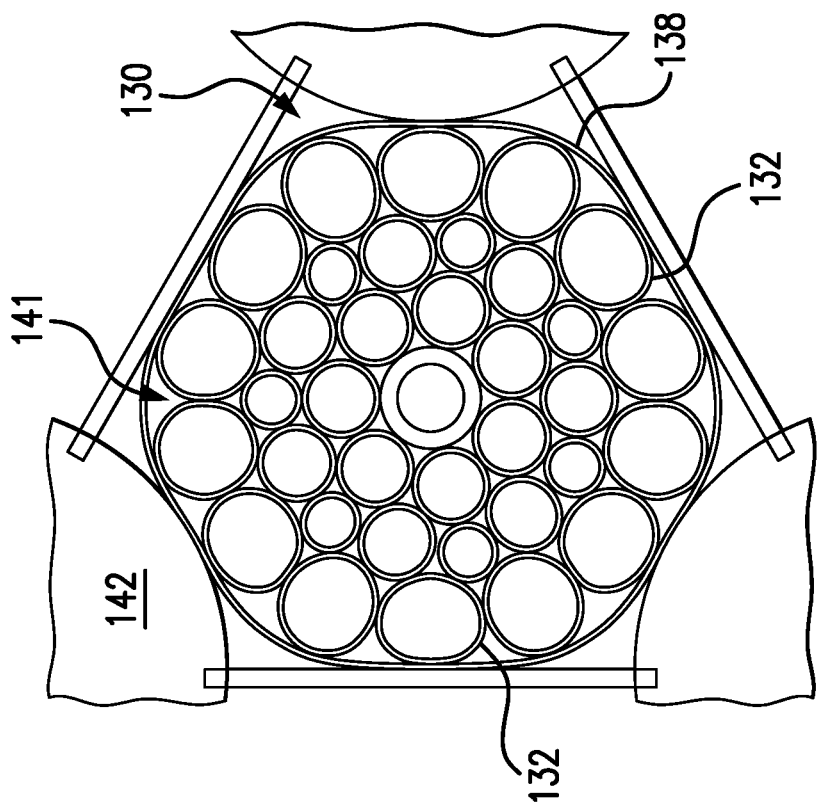
FIGS. 6A through 6C are end views of a swaging operation being performed on the fuel compact shown in FIG. 5.
Figure 6A:
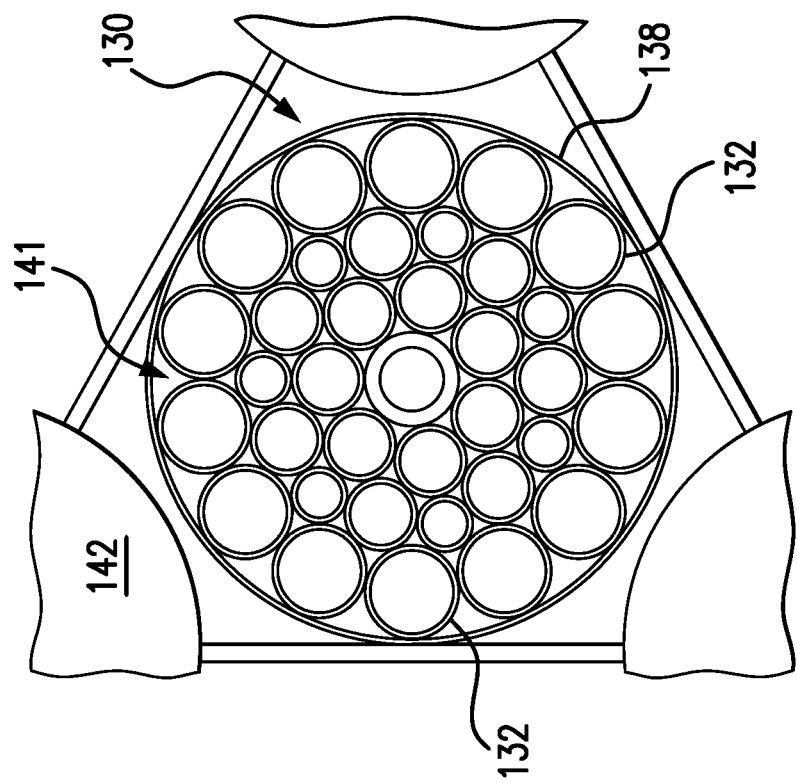
Figure 7:
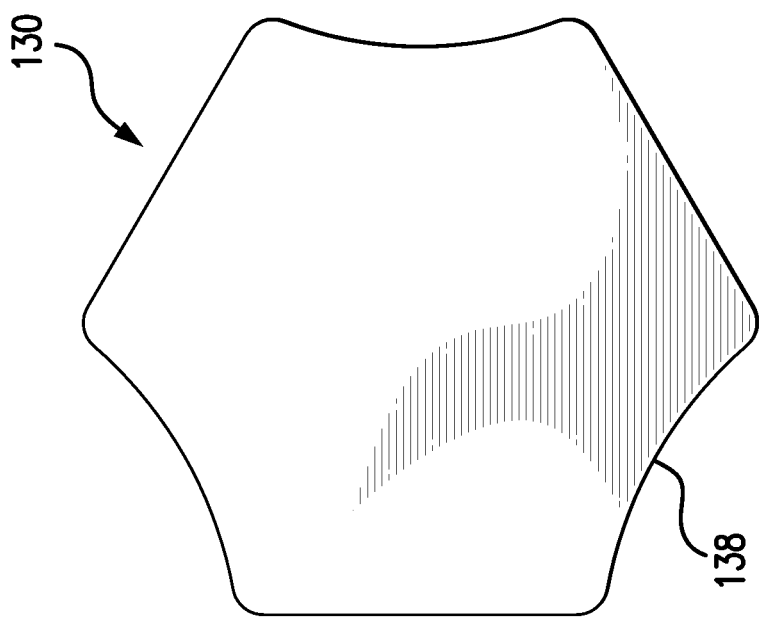
FIG. 7 is an end view of a finished fuel compact in accordance with an embodiment of the present invention.
Figure 6C:
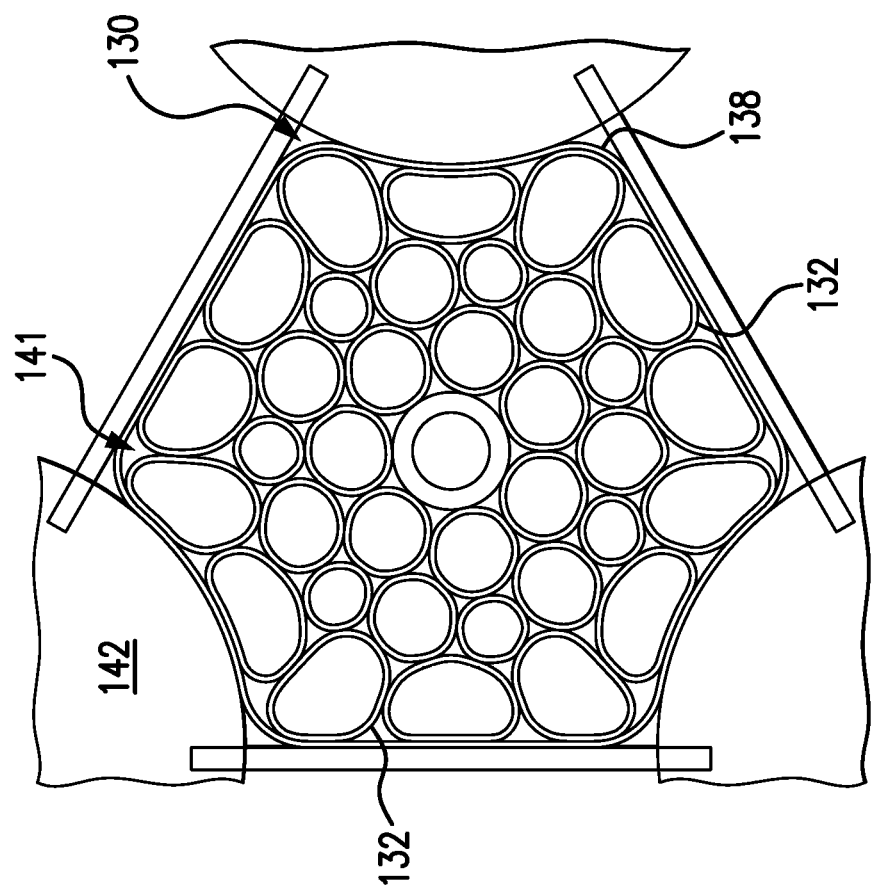

Referring now to FIGS. 6A through 6C, after arranging fuel pins 132 within fuel compact cladding tube 138 in the desired pattern, a swaging process is performed on fuel compact 130 in order to achieve the desired cross-sectional shape of the compact for later insertion into a corresponding lattice site 122 (FIG. 8). In the example embodiment shown, the swaging process is performed in a press 142 that deforms fuel compact cladding tube 138 into the desired cross-sectional shape. As shown, the cross-sectional shape of fuel compact 130 is a full trefoil that will allow fuel compact 130 to be disposed in any of lattice sites 122 that are not adjacent to a sidewall 116 of lattice structure 114.

Figure 9:
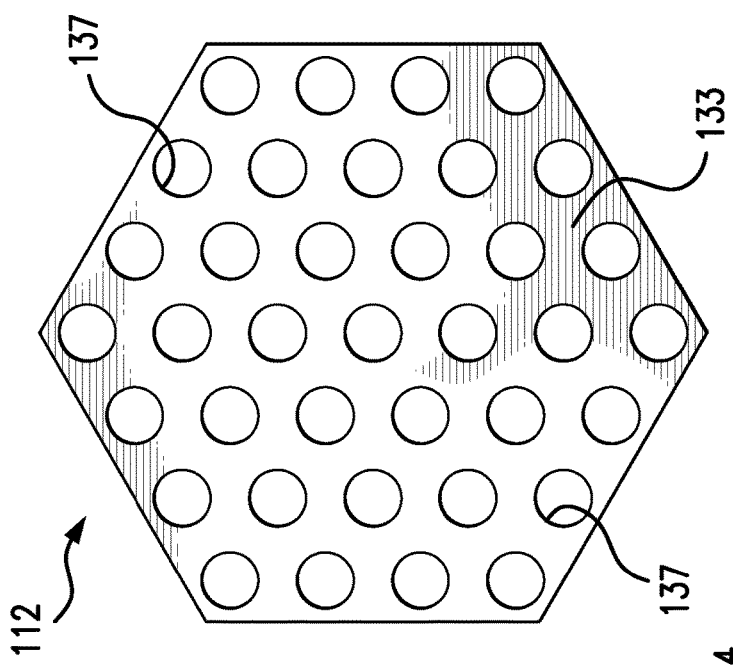
FIG. 9 is an end view of the fuel cartridge shown in FIG. 8 after the fuel compacts are inserted into the lattice.

Referring now to FIG. 8, each fuel compact 130 is inserted in a corresponding lattice site 122 of lattice structure 114 in an interference fit. Preferably, the interference fit is achieved by heating lattice structure 114 prior to inserting fuel compacts 130 into the corresponding lattice sites 122. After each lattice site 122 receives a corresponding fuel compact 130 therein, top wall 133 and a bottom wall (not shown) are resistance welded to the top and bottom ends of lattice structure 114 to complete construction of fuel cartridge 112, as shown in FIG. 9. Both the top and bottom walls include a plurality of apertures 137, each aperture 137 corresponding to a location of one of the lattice's elongated tubes 118 so that reactor coolant may flow therethrough.

Figure 10B:
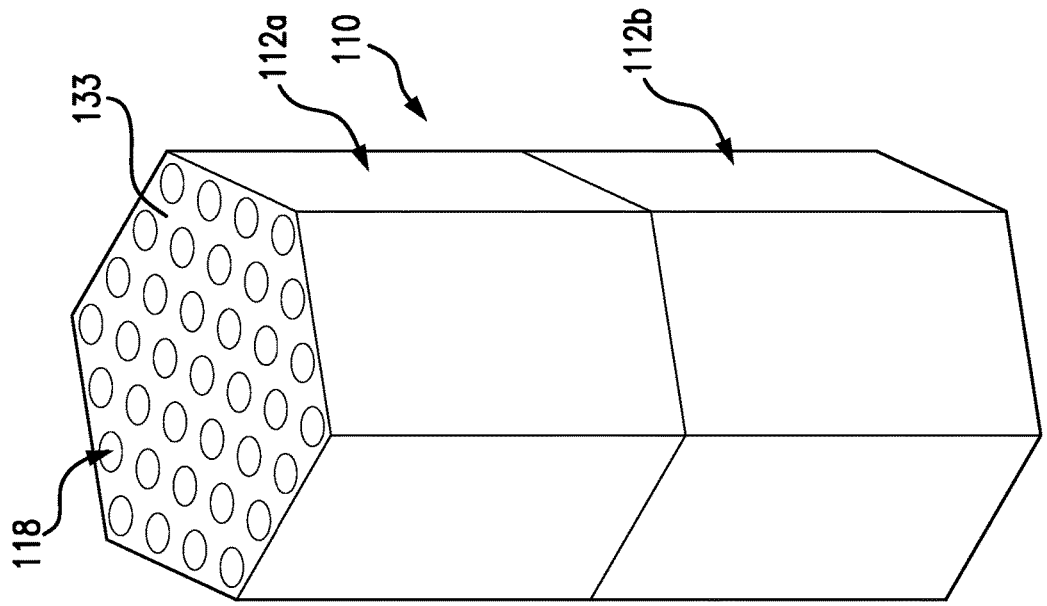
FIGS. 10A and 10B are perspective views of fuel cartridges, shown in FIG. 9, being assembled to form a fuel assembly.
Figure 10A:
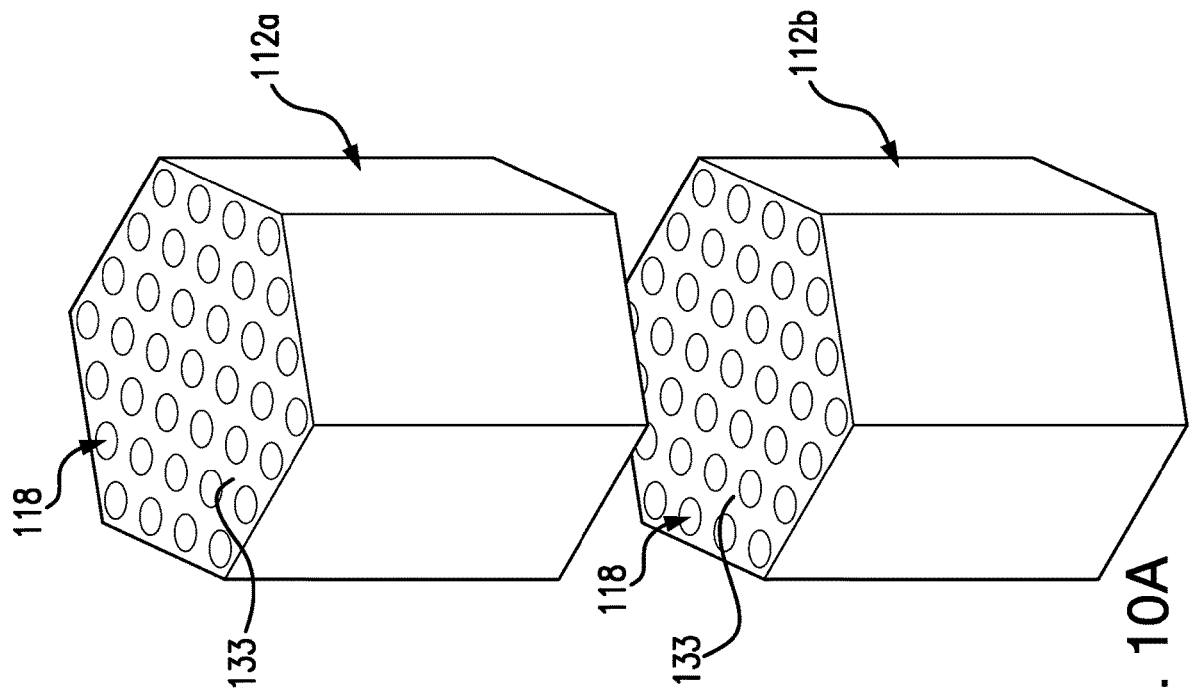

Referring now to FIGS. 10A and 10B, each fuel assembly 110 is fabricated by stacking the desired number of fuel cartridges 112a, 112b, etc., until the desired length of the fuel assembly is achieved. The stacked fuel cartridges 112a, 112b are then unified by methods such as, but not limited to, diffusion bonding, resistance welding, mechanical fastening, etc. In that each fuel assembly 110 is constructed of individual fuel cartridges 112 that are then fastened to each other, the material composition of the fuel within each fuel cartridge 112 may be varied from the remaining fuel cartridges 112. As such, the material gradient of each fuel assembly 110 may be varied along its axial link. For example, referring again to FIG. 2, reduced amounts of tungsten may be used in fuel cartridge 112a that forms the upper portion of fuel assembly 110 as compared to fuel cartridge 112c, which forms the bottom portion of fuel assembly 110. Although it may be desirable to have increased amounts of tungsten in the bottom fuel cartridge 112c due to increased temperatures in that portion of the reactor core, it may be desirable to reduce the amounts of tungsten in fuel cartridges 112a and 112b as the temperature is lower in higher positions within the core. This can be advantageous in that tungsten can be difficult to isotopically enrich and is heavier than various other materials, such as molybdenum, that may be used in its place where lower temperatures are encountered.

These and other modifications and variations to the invention may be practiced by those of ordinary skill in the art without departing from the spirit and scope of the invention, which is more particularly set forth in the appended claims. For example, in alternate embodiments of the present invention, rather than disposing fuel compacts in corresponding lattice sites when constructing a fuel cartridge, as described above, the fuel dispersion method may be used to fill the interior of the lattice structure that surrounds the flow channels. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A nuclear fuel assembly for a nuclear reactor core, comprising:
at least one fuel cartridge comprising:
a lattice structure including an outer wall defining an interior volume and a plurality of inner walls, the lattice structure defining a longitudinal center axis,
at least one elongated tube extending through the interior volume of the lattice structure to define a flow channel;
the lattice structure defining at least one lattice site disposed in the interior of the lattice structure adjacent to the elongated tube, a horizontal cross-sectional shape of the lattice site being defined at least in part by at least one of the inner walls and a corresponding portion of an outer circumference of the elongated tube; and
at least one fuel compact disposed within a corresponding one of the at least one lattice site, the fuel compact including a fuel compact cladding tube defining an interior volume,
wherein a horizontal cross-sectional shape of the at least one fuel compact is non- circular and is the same as the horizontal cross-sectional shape of the corresponding one of the at least one lattice site.

2. The nuclear fuel assembly of claim 1, wherein:
the at least one elongated tube of the lattice structure comprises a plurality of elongated tubes defining respective flow channels,
the at least one lattice site of the lattice structure comprises a plurality of lattice sites, and
the at least one fuel compact comprises a plurality of fuel compacts, each fuel compact including:
a plurality of fuel pins, each fuel pin including a pin cladding tube defining an interior volume, and fissionable fuel disposed within the interior volume of the pin cladding tube,
wherein the plurality of fuel pins is disposed within the interior volume of the fuel compact cladding tube, and the horizontal cross-sectional shape of the fuel compact is defined by the fuel compact cladding tube.

3. The nuclear fuel assembly of claim 2, wherein the fissionable fuel in the plurality of fuel pins is one of a fuel pellet, a plurality of fuel kernels and fuel powder.

4. The nuclear fuel assembly of claim 2, wherein each fuel pin and the fuel compact cladding tube of each fuel compact are cylindrical prior to a swaging process that results in the horizontal cross-sectional shape of the fuel compact.

5. The nuclear fuel assembly of claim 4, wherein an outer diameter of a first fuel pin is greater than the outer diameter of a second fuel pin, the first and the second fuel pins being disposed in one of the plurality of fuel compact cladding tubes.

6. The nuclear fuel assembly of claim 2, wherein the at least one fuel cartridge comprises a plurality of fuel cartridges, and each fuel cartridge further comprises a top wall and a bottom wall disposed on opposite ends of the lattice structure so that each lattice site defines a sealed volume.

7. The nuclear fuel assembly of claim 6, wherein the top wall and bottom wall of each fuel cartridge defines a plurality of apertures, each aperture corresponding to a location of a corresponding flow channel of the fuel cartridge.

8. The nuclear fuel assembly of claim 2, each lattice structure further comprising a plurality of inner walls, wherein each inner wall extends between either of a pair of adjacent elongated tubes or an elongated tube and the outer wall of the lattice structure.

9. The nuclear fuel assembly of claim 2, wherein the outer wall of each lattice structure has a hexagonal cross-section taken horizontally to the longitudinal center axis of the lattice structure.

10. The nuclear fuel assembly of claim 9, wherein the nuclear fuel assembly includes a plurality of fuel cartridges that are disposed end to end and secured to each other.

11. The nuclear fuel assembly of claim 9, wherein the fuel cartridges of the fuel assembly are secured to each other by one of diffusion bonding, resistance welding and mechanical fastening.

12. The nuclear fuel assembly of claim 9, wherein a material gradient of a first fuel cartridge is different than a material gradient of a second fuel cartridge.

13. The nuclear fuel assembly of claim 9, wherein fuel enrichment of a first fuel cartridge is different than a fuel enrichment of a second fuel cartridge.

14. The nuclear fuel assembly of claim 13, wherein the first fuel cartridge includes a greater amount of fissionable fuel than does the second fuel cartridge.

15. The nuclear fuel assembly of claim 1, wherein the horizontal cross-sectional shape of both the at least one fuel compact and the at least one lattice site is a trefoil.

16. A nuclear fuel assembly for a nuclear reactor core, comprising:
at least one fuel cartridge comprising:
a lattice structure including an outer wall defining an interior volume;
at least one flow channel extending through the interior volume of the lattice structure;
at least one lattice site disposed in the interior of the lattice structure; and
at least one fuel compact including a longitudinal center axis, comprising:
a fuel compact cladding tube defining an interior volume, and
a plurality of fuel pins arranged inside the fuel compact cladding in parallel with one another, each fuel pin including a longitudinal center axis, a pin cladding tube defining an interior volume, and fissionable fuel disposed within the interior volume of the pin cladding tube,
wherein the plurality of fuel pins include at least a first fuel pin having an outer diameter that is greater than an outer diameter of a second fuel pin, and the plurality of fuel pins is disposed within the interior volume of the fuel compact cladding tube so that a first distance between the longitudinal center axis of the first fuel compact fuel pin and the longitudinal center axis of the fuel compact is greater than a second distance between the longitudinal center axis of the fuel compact second fuel pin and the longitudinal center axis of the fuel compact.

17. The nuclear fuel assembly of claim 16, wherein:

the at least one flow channel of the lattice structure comprises a plurality of flow channels, the at least one lattice site of the lattice structure comprises a plurality of lattice sites, and the at least one fuel compact comprises a plurality of fuel compacts.

18. The nuclear fuel assembly of claim 16, wherein a horizontal cross-sectional shape of the at least one fuel compact is non-circular and is the same as a horizontal cross-sectional shape of the corresponding one of the at least one lattice site.

19. The nuclear fuel assembly of claim 18, wherein the horizontal cross-sectional shape of both the at least one fuel compact and the at least one lattice site is a trefoil.

20. A nuclear fuel assembly for a nuclear reactor core, comprising:

at least one fuel cartridge comprising:

a lattice structure including an outer wall defining an interior volume, the lattice structure defining a longitudinal center axis;

a plurality of elongated tubes extending through the interior volume of the lattice structure to define respective flow channels;

the lattice structure defining a plurality of lattice sites disposed in the interior of the lattice structure; and a plurality of fuel compacts disposed within corresponding ones of the lattice sites, wherein a horizontal cross-sectional shape of each of the fuel compacts is non-circular and is the same as a horizontal cross-sectional shape of the corresponding lattice site and wherein a portion of the horizontal cross-sectional shape of the corresponding lattice site is defined by a corresponding portion of an outer circumference of an adjacent elongated tube, wherein each fuel compact includes:

a fuel compact cladding tube defining an interior volume, and a plurality of fuel pins, each fuel pin including a pin cladding tube defining an interior volume, and fissionable fuel disposed within the interior volume of the pin cladding tube, wherein the plurality of fuel pins is disposed within the interior volume of the fuel compact cladding tube, and the horizontal cross-sectional shape of the fuel compact is defined by the fuel compact cladding tube.

\* \* \* \* \*